Sept. 26, 1939. G. W. BOWEN 2,174,076
GRAPPLE
Original Filed May 13, 1935 3 Sheets-Sheet 1

Inventor
George W. Bowen
By
Hardway Cather
Attorneys

Inventor
George W. Bowen
By Hardway & Cathey
Attorneys

Sept. 26, 1939.  G. W. BOWEN  2,174,076
GRAPPLE
Original Filed May 13, 1935   3 Sheets-Sheet 3

Inventor
George W. Bowen
By Hardway Cather
Attorneys

Patented Sept. 26, 1939

2,174,076

UNITED STATES PATENT OFFICE 2,174,076

GRAPPLE

George W. Bowen, Houston, Tex.

Application May 13, 1935, Serial No. 21,180
Renewed June 11, 1938

14 Claims. (Cl. 294—96)

This invention relates to a grapple and has particular relation to that type of grapple which has been especially designed to be readily engaged with a pipe or other object stuck in a well bore whereby the engaged pipe or object may be pulled from the bore.

The prime object of the invention is to provide a grappling tool of the character described which may be lowered, as a unit, into the well into engagement with a pipe, a collar, or a tool joint, and which is equipped with packing means for forming a fluid-tight joint between the tool and the engaged object, and is of such construction that either the pipe collar or tool joint may be engaged, and said fluid-tight joint formed without changes in, or adjustments of, the tool itself.

Another object of the invention is to provide a grapple, or pipe puller, adapted to be lowered into a well bore and inserted into and engaged with a stuck pipe, or which may be engaged about a pipe, or other similar objects stuck in a well bore and which will securely engage the stuck object, whereby the latter may be removed from the bore; the grapple is of such novel construction that it may be readily released from the stuck object in case the latter cannot be pulled.

The invention embodies a novel type of jaw or grappling member which is so mounted that the tool may be readily lowered into grappling relation with the pipe to be pulled, and which, upon upward movement of the tool, will securely grip the object to be pulled, but which may be released in a novel manner in case the pipe is so tightly stuck in the bore that it cannot be dislodged and removed.

Another object of the invention is to provide, in a grappling tool of this type, a novel type of packing arranged to form a fluid-tight joint, or seal, about a pipe over which the grappling tool is telescoped so that the fluid may be forced, under pressure, down through the operating string, and the fluid will be forced to pass on down through the stuck pipe and returned up around it so that in many cases the stuck pipe may be washed free, to the end that it may be more easily pulled from the bore.

With the above and other objects in view, the invention has particular relation to certain novel features of construction, operation, and arrangement of parts, examples of which are given in this specification and illustrated in the accompanying drawings, wherein—

Figures 1, 2:
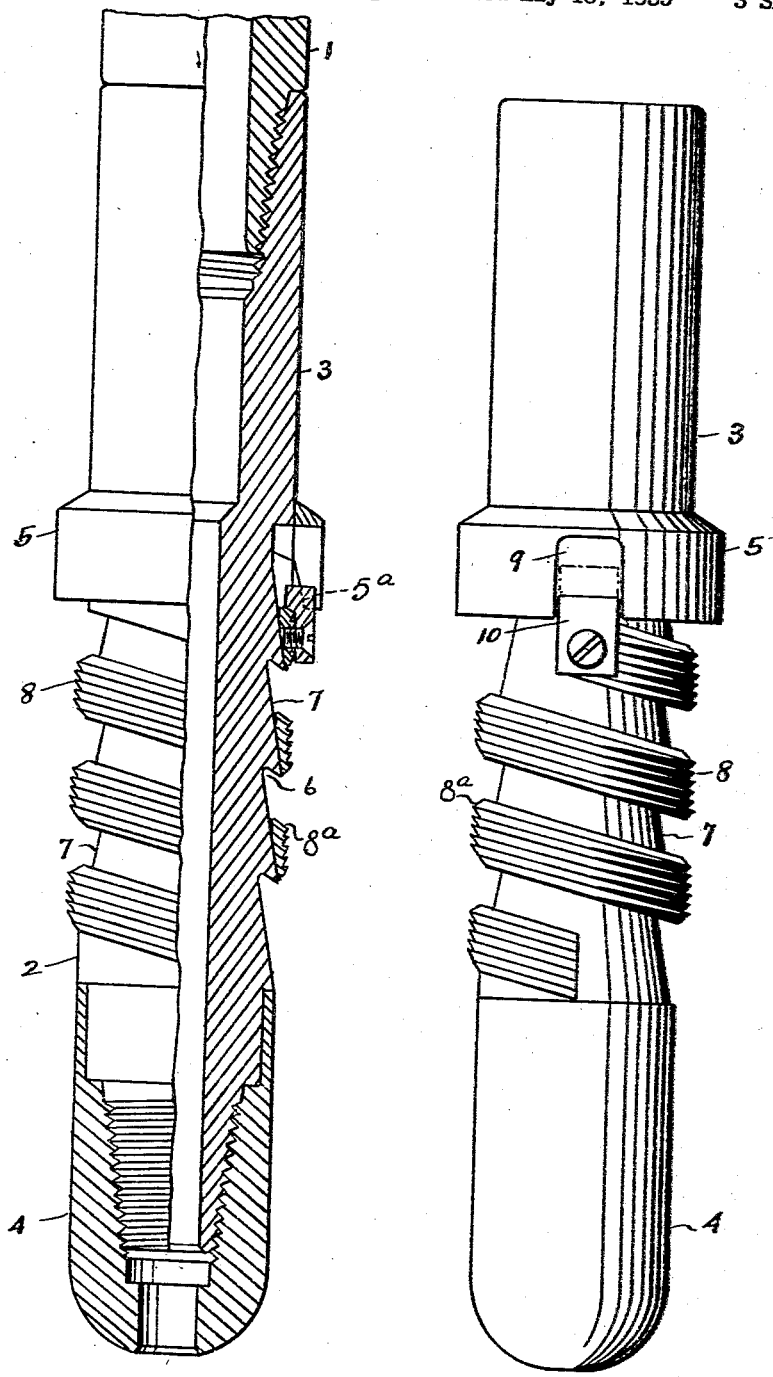
Figure 1 shows a side view, partly in section, of a spear-type of grappling tool, particularly adapted to be inserted into the pipe to be pulled.
Figure 2 shows a side view thereof taken at right angles to the view shown in Figure 1.
Figures 3, 4, 5, 6:
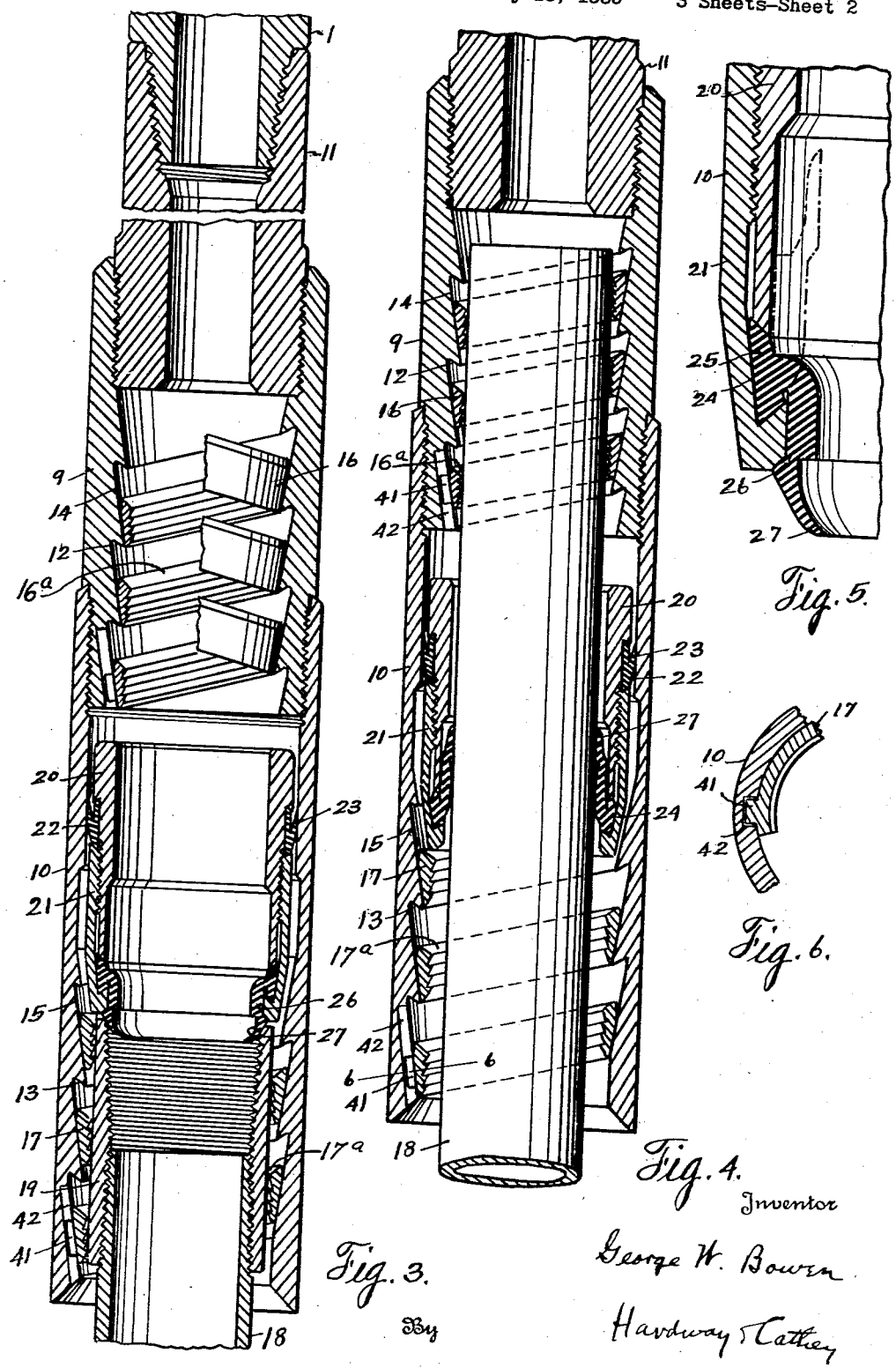
Figure 3 shows a vertical sectional view of an overshot-type of grappling tool embodying the invention and illustrating the same as engaged with a coupling of a pipe to be pulled, and illustrating the packing forming a fluid-tight joint within the upper end of such coupling.
Figure 4 shows a vertical sectional view thereof illustrating this type of tool as engaged with the stuck pipe, and illustrating the packing forming a fluid-tight joint about the engaged pipe.
Figure 5 shows an enlarged fragmentary vertical sectional view more accurately disclosing the type of packing employed.
Figures 7, 8:
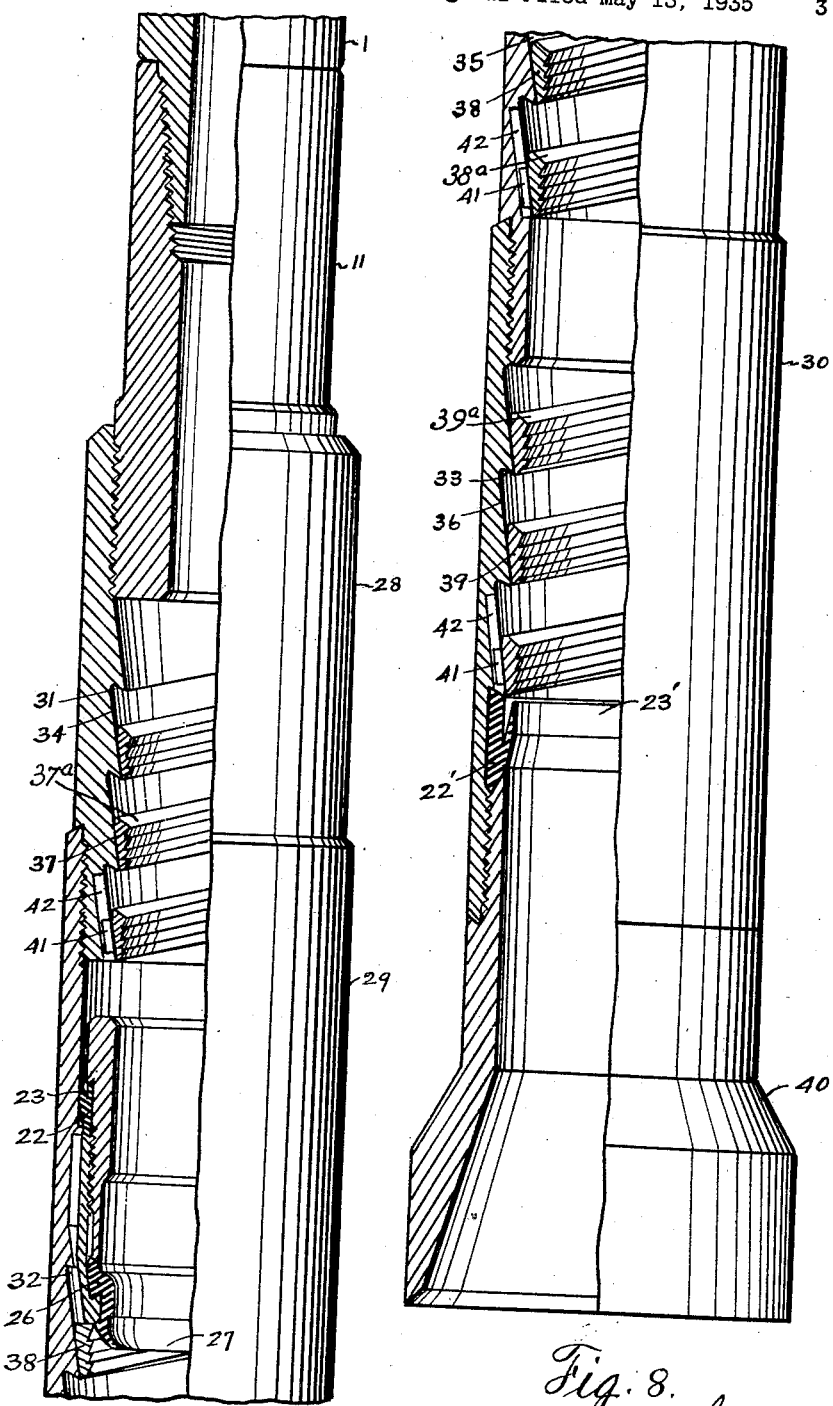

Figure 6 shows a fragmentary transverse sectional view taken on the line 6—6 of Figure 4, and Figures 7 and 8 show upper and lower sections, respectively, of the type of grappling tool employed which is capable of telescoping over a stuck pipe and engaging either a large size tool joint and packing off around said joint, or engaging a coupling of the stuck pipe and forming a fluid-tight joint with said coupling, or engaging the stuck pipe directly and forming a fluid-tight seal therewith; Figure 8 also showing a guide for use in large holes.

Referring now more particularly to the drawings wherein like numerals of reference designate the same parts in each of the figures, the numeral 1 designates a tubular operating string of pipe, to the lower end of which either type of the grappling tool may be connected. The numeral 2 designates a mandrel as a whole which is tubular in form, whose upper end is formed with the internal threaded shank 3 and whose lower end has the guide 4 thereon, the lower end of said guide being preferably oval. Around the lower end of the shank 3, there is the collar-like stop 5 which may be welded or otherwise secured to said shank. The collar has an undercut groove 5a for the purpose hereinafter stated.

Beneath the stop the mandrel has the spiralled undercut groove 6 formed with the downwardly flared spiralled face 7 forming an expander. On this face there is an expansible spiralled grappling member, or jaw 8, whose upper margin 8a is downwardly and outwardly beveled to conform to the shape of the groove 6 and whose inner face is shaped to conform to the shape of and to ride closely against the face 7. The outer surface of the grappling member 8 is provided with gripping teeth which preferably are pitched upwardly and outwardly.

The stop 5 has a wide notch 9 extending upwardly from its lower margin, and the upper end of the grappling member, or jaw 8, is provided with a lug 10 which is fitted loosely into said notch. This type of grappling tool may be lowered into the well and guided into the upper end of the stuck pipe by the guide 4 until the stop 5 rests on the upper end of said pipe.

The grappling member 8 will frictionally engage the inner wall of the pipe as the grappling tool enters said pipe and, if desired, as the tool enters the pipe, said tool may be rotated to the right and the grappling tool, or jaw, 8, being in frictional contact with said pipe, will be contracted and will ride upwardly relative to the face 7 and the upper margin 8a of the jaw will wedge into, and the jaw will be further contracted by said margin wedging into, the groove 6 so that the tool may the more readily enter the pipe. An upward pull may now be exerted on the operating string 1 by equipment provided at the ground surface for that purpose, and as the mandrel 2 moves upwardly, the jaw 8 will be expanded into secure engagement with the stuck pipe, and the pipe may thus be removed from the bore, unless too tightly stuck to be dislodged. In case the pipe cannot be pulled, the operating string 1 may be turned to the right and may be at the same time pulled upwardly with the result that the grappling member or jaw 8 will be contracted, and at the same time screwed out of the upper end of the pipe, and the tool may then be withdrawn from the bore. If the tool is rotated rapidly and pulled slowly upwardly, the jaw will ride upon the face 7 and its beveled upper margin 8a will enter the groove 6, thus further contracting the jaw and conducing to the ready release of the tool.

In Figures 3 and 4 an overshot-type of grappling tool is illustrated wherein the numerals 9 and 10 designate upper and lower bowls, respectively, forming a tubular housing which is connected to the operating string by means of the tubular coupling member 11. The upper bowl 9 of the housing is inwardly thickened and is of somewhat smaller inside diameter than that of the lower bowl 10. The upper and lower bowls have the lefthand undercut grooves 12, 13, respectively, formed with the downwardly converging spiralled faces 14, 15, and on these faces are mounted the upper and lower grappling members, or jaws, 16, 17, respectively. The upper margins 16a, 17a of these jaws are downwardly and outwardly beveled to conform to the shape of and to fit snugly in the grooves 12 and 13 and the outer faces of these jaws are downwardly and inwardly tapered to conform to the shape of, and to ride against the corresponding faces 14, 15, and their inner surfaces are formed with pipe-engaging teeth which are preferably upwardly and inwardly pitched.

It will be observed that the inside diameter of the grappling member, or body 16 is of a diameter to engage, directly, the pipe 18 to be pulled while the inside diameter of the grappling member, or jaw, 17, is somewhat larger and is of a size to engage the outside of a coupling, as 19, of said pipe 18. The type of tool shown in Figures 3 and 4 has been especially designed to engage a pipe collar or tool joint of dimensions adopted as standard by the American Petroleum Institute. If the pipe 18 should become broken off a distance above the tool joint or pipe coupling then in some instances the jaw 16 will engage the remaining portion of the pipe above the coupling and the jaw 17 will simultaneously engage the coupling.

Within the lower bowl 10 of the housing, there is a tubular cage preferably composed of upper and lower sections 20, 21, the lower end of the former of which is screwed into the upper end of the latter, and surrounding this cage and clamped between said upper and lower sections thereof and located in a countersunk groove in the upper section, there is a cup-like packing 22 having an upwardly and outwardly flared lip 23 which fits closely within the housing so as to form a fluid-tight joint between the cage and housing. The lower end of the cage is slightly tapered inwardly and downwardly and is inwardly thickened, and the lower end of the upper section 20 of the cage forms with said inwardly thickened portion an annular dove-tailed inside groove 24 within the lower end of the cage in which is securely seated the dove-tailed portion 25 into which the upper end of the packing sleeve 26 is formed. This packing sleeve normally extends down through the lower end of the cage and terminates in an inwardly curved annular lip portion 27. When the coupling 19 is engaged, as illustrated in Figure 3, the lip 27 will fit around in the upper end of the coupling so as to form a fluid-tight seal therewith. When the grappling tool is telescoped over the upper end of the stuck pipe and engaged directly with the pipe, as illustrated in Figure 4, the packing sleeve 26 will be reversed,—that is, when the lip 27 of said packing sleeve engages the upper end of the stuck pipe, as the grappling tool is being lowered, said packing sleeve will be forced upwardly into the cage and will assume the position shown in dotted lines in Figure 5, and in full lines in Figure 4, and when the grappling tool is further lowered into pipe-engaging position, said packing sleeve will closely surround the pipe and will grip the same and form a fluid-tight joint therewith. This is desirable for the reason that in case the pipe 18 is so tightly stuck that it cannot be withdrawn, water may be forced down through the operating string 1 and will be compelled by said packing to flow on down through the stuck pipe and out at its lower end and back up around it, and in this manner, the stuck pipe may often be washed loose.

While this washing operation is being carried on, the packing 22 prevents the washing fluid from passing down around the packing cage, and the packing 26 prevents it from passing down between the cage and stuck pipe.

During the washing operation above referred to, if the grappling tool is engaged with the coupling 19, the pressure of the washing fluid will hold the lip 23 out close against the housing and the cage will be forced downwardly into position adjacent the upper end of the stuck pipe and the lip 27 will be held by said pressure, expanded closely against the upper end of said coupling. If the grappling tool engages the pipe directly, as shown in Figure 4, the pressure of the washing fluid will hold the lip 23 outwardly against the housing and will hold the lip 27 inwardly against the surrounded pipe to form fluid-tight joints, and the grappling member, or jaw, beneath the cage, will act as a support for said cage.

The type of grappling tool illustrated in Figures 7 and 8, has been especially designed for use in wells having comparatively large bores, and/or oversize tool joints. In this type, the housing is formed of a plurality of bowls, preferably three, indicated by the numerals 28, 29, and 30. The inside diameter of these bowls are progressively enlarged from above, downwardly, and have the respective inside lefthand grooves 31, 32, 33, formed with inside downwardly converging faces 34, 35, and 36, respectively, which are spiralled to the left. On these respective faces are the gripping members, or gripping jaws 37, 38, and 39, whose upper margins 37a, 38a, 39a are downwardly and outwardly beveled to conform to the shape of and to wedge into the corresponding grooves 31, 32 and 33 and whose outer sides are shaped to conform to the contour of and to ride against the respective faces 34, 35, and 36, and whose inner sides have pipe engaging teeth, preferably pitched upwardly and inwardly. The lower end of the housing is formed with a bell-shaped guide 40 to guide the tool over the upper end of the stuck pipe. The lower grappling member 39 is of such inside diameter as to readily engage a tool joint which ordinarily is of a larger outside diameter than the usual pipe coupling. Beneath this grappling member, or jaw, 39, there is an inside packing 22' around and anchored to the inside wall of the housing, and having the inside upwardly and inwardly directed lip 23' arranged to closely surround the tool joint. In case the upper end of the stuck pipe carries a coupling, such as illustrated in Figure 3, said coupling may be engaged by the grappling member, or jaw 38, in which event the packing 26 will form a fluid-tight joint with the upper end of said coupling, and in case the stuck pipe does not have a coupling at its upper end to be directly engaged by the grappling member, the grappling device of the form shown in Figures 7 and 8 is telescoped over the upper end of the stuck pipe in the manner shown in Figure 4, and the grappling member or jaw 37 is engaged with the pipe, as illustrated in said last mentioned figure, the packing 26 in such event, assuming a reversed position and forming a close seal about the pipe for the purpose hereinabove fully explained. In case the pipe is broken off above a coupling or tool joint the jaw 37 will engage the remaining portion of the pipe above the coupling and the coupling or tool joint beneath will be engaged by the jaw 38 or 39 beneath.

The lower end of each grappling member, or jaw, illustrated in Figures 3, 4, 6, 7, and 8, has an outside lug 41 which is slidable in a vertical groove 42, whereby said jaws are maintained in the desired relation with the housing. When the overshot is lowered over the pipe a jaw will engage the pipe or coupling by friction and will ride upwardly on the corresponding face and the upper margin thereof will enter and wedge into the groove above thus more effectively expanding the jaw.

When the stuck pipe is engaged by the overshot type of grappling tool and the pull is taken and the tool cannot be dislodged, the operating string may be turned to the right, and at the same time, pulled upwardly. In as much as the lower end of the jaw is connected to the housing by the lug 41, upon such turning movement, the jaw engaging the pipe will be expanded, and its grip on the pipe will thus be released, and a continued turning of the operating string and an upward pull thereon will be effective to cause the tool to be released from the stuck pipe. If the string is turned rapidly and slowly pulled upwardly the jaw in engagement with the pipe or coupling will ride up on the corresponding tapering face and its upper beveled margin will wedge into the undercut groove above, thus more effectively expanding said jaw.

The drawings and description disclose what is now considered to be preferred forms of the invention by way of illustration only, while the broad principle of the invention will be defined by the appended claims.

What I claim is:

1. A grapple for engaging and removing a stuck pipe from a well and comprising an operating string, a mandrel attached to the string and having a spiralled, downwardly flared seat thereon, a yieldable pipe-gripping jaw having a spiralled face shaped to fit on said seat, and means for retaining one end of the jaw.

2. A grapple for removing stuck pipe from a well and comprising an operating string, a support for a pipe gripping member attached to the string and having a spiralled, tapering seat, a spiralled, flexible pipe-gripping member on said seat, and means for retaining one end of the gripping member against rotation relative to the support.

3. A pipe grappling device shaped to be telescoped with a pipe in a well and comprising an operating string, a support connected to the string, a spiralled seat on the support presenting a face in angular relation to the longitudinal axis of the support, a spiralled, yieldable pipe-engaging member seated against said face, and one end only of which is slidably connected to the support.

4. A pipe grappling device shaped to be telescoped with a pipe in a well and comprising an operating string, a support connected to the string, a spiralled seat on the support presenting a face in angular relation to the longitudinal axis of the support, a spiralled, yieldable pipe-engaging member seated against said face, a tubular packing cage in the support, packing on the cage arranged to form a seal between the cage and support and between the cage and pipe.

5. In a pipe grappling device, a tubular support having a spiralled face in angular relation to the axis of the support, a yieldable, spiralled, pipe gripping jaw seated on the face, one end of the jaw being slidably associated with the support whereby, upon rotation of the support, the release of the jaw from the engaged pipe will be effected.

6. In a pipe grappling device, a tubular support, pipe-gripping means therein, a tubular packing cage in the support, packing carried by the cage and arranged to form fluid-tight seals between the cage and support and between the cage and the engaged pipe.

7. An implement for removing pipe and the like from a well bore and comprising an operating string, a supporting body attached to the string and shaped to telescope with the object to be pulled, a flexible gripping member carried by the body and shaped to conform to the curvature of, and to grip the object with which said supporting body is telescoped, and additional means for directly connecting the gripping member to the body whereby, upon rotation of the body, the diameter of the effective gripping surface of said gripping member may be varied.

8. In a pipe grappling device, a tubular support having a spiralled face in angular relation to the axis of the support, a yieldable, spiralled pipe gripping jaw seated on the face, means for slidably connecting the jaw to the support whereby, upon rotation of the support, the release of the jaw from the engaged pipe will be effected.

9. In a pipe grappling device, a tubular support having a spiralled face in angular relation to the axis of the support, a yieldable spiralled pipe gripping jaw seated on the face, means for connecting the jaw to the support whereby upon rotation of the support in one direction the jaw will be expanded and released from the engaged pipe, and upon rotation of the support in the other direction the jaw will be contracted and caused to more securely grip the engaged pipe.

10. In a grappling device, a support shaped to telescope with an object stuck in a well, said support having a spiralled face in angular relation with the axis of the support, a yieldable gripping jaw having a surface shaped to conform to the shape of and to seat on said face, means for operatively connecting the jaw to the support whereby upon rotation of the support in one direction the diameter of the jaw will be varied to more securely engage the stuck object and upon rotation of the support in the other direction the diameter of the jaw will be varied to release the stuck object.

11. In a grappling tool, a support shaped to telescope with an object, said support having a helical face in angular relation with the axis of the support and having a helical groove defining one margin of said face, a yieldable gripping jaw having a helical face shaped to conform to the shape of and to seat on the face on the support and terminating in a margin adapted to wedge into said groove, upon movement of the support, relative to the jaw, in one direction, to vary the diameter of the jaw.

12. In a grappling tool, a support shaped to telescope with an object, said support having a helical face in angular relation with the axis of the support and having a helical groove defining one margin of said face, a yieldable gripping jaw having a helical face shaped to conform to the shape of and to seat on the face on the support and terminating in a margin adapted to wedge into said groove, upon movement of the support, relative to the jaw, in one direction, to vary the diameter of the jaw, to cause the jaw to release the stuck object.

13. A grappling device comprising a support shaped to telescope with an object stuck in a well, said support having a spiralled face in angular relation with the axis of the support, a yieldable gripping jaw adapted to engage said object and shaped to conform to the shape of and to seat on said face, a connection between the jaw and support whereby upon rotation of the support in one direction, the diameter of the jaw will be varied to more securely engage the stuck object, and upon rotation of the support in the other direction, the diameter of the jaw will be varied to release the stuck object.

14. A grappling device comprising a support shaped to telescope with an object stuck in a well, said support having a spiralled face in angular relation with the axis of the support, a yieldable gripping jaw adapted to engage said object and shaped to conform to the shape of and to seat on said face, a connection between the jaw and support whereby upon rotation of the support the diameter of the jaw will be varied to release the stuck object.

GEORGE W. BOWEN.